(12) United States Patent
Baker et al.

(10) Patent No.: US 6,184,676 B1
(45) Date of Patent: Feb. 6, 2001

(54) COOLING SYSTEM FOR TEST HEAD

(75) Inventors: David A. Baker, Hillsboro; Wen Wei, Beaverton, both of OR (US); Henry Hanson, Marysville, WA (US)

(73) Assignee: Credence Systems Corporation, Fremont, CA (US)

( * ) Notice: Under 35 U.S.C. 154(b), the term of this patent shall be extended for 0 days.

(21) Appl. No.: 09/267,541

(22) Filed: Mar. 12, 1999

(51) Int. Cl.⁷ .................................................. G01R 31/02
(52) U.S. Cl. ........................................ 324/158.1; 324/754
(58) Field of Search .............................. 324/158.1, 754, 324/755, 757, 758, 765; 361/695, 687, 699

(56) References Cited

U.S. PATENT DOCUMENTS

| | | | |
|---|---|---|---|
| 5,834,946 | * 11/1998 | Albrow et al. | 324/760 |
| 5,889,651 | * 3/1999 | Sasaki et al. | 361/699 |
| 5,986,447 | * 11/1999 | Hanners et al. | 324/158.1 |

\* cited by examiner

Primary Examiner—Safet Metjahic
Assistant Examiner—Minh Tang
(74) Attorney, Agent, or Firm—John Smith-Hill; Smith-Hill and Bedell

(57) ABSTRACT

A test head for a semiconductor integrated circuit tester comprises a housing which has an air inlet opening and an air outlet opening and bounds a pin card space and an air chamber. Multiple pin cards are located in the pin card space and radiate from an interior cavity which is within the pin card space. A baffle structure divides the air chamber, which is separated from the pin card space by a boundary surface, into an air supply duct which provides communication between the air inlet opening and the interior cavity and an outlet plenum which provides communication between the pin card space and the air outlet opening by way of the boundary surface. A fan is mounted in the interior cavity for inducing a flow of air from the interior cavity to the plenum by way of spaces between the pin cards.

14 Claims, 3 Drawing Sheets

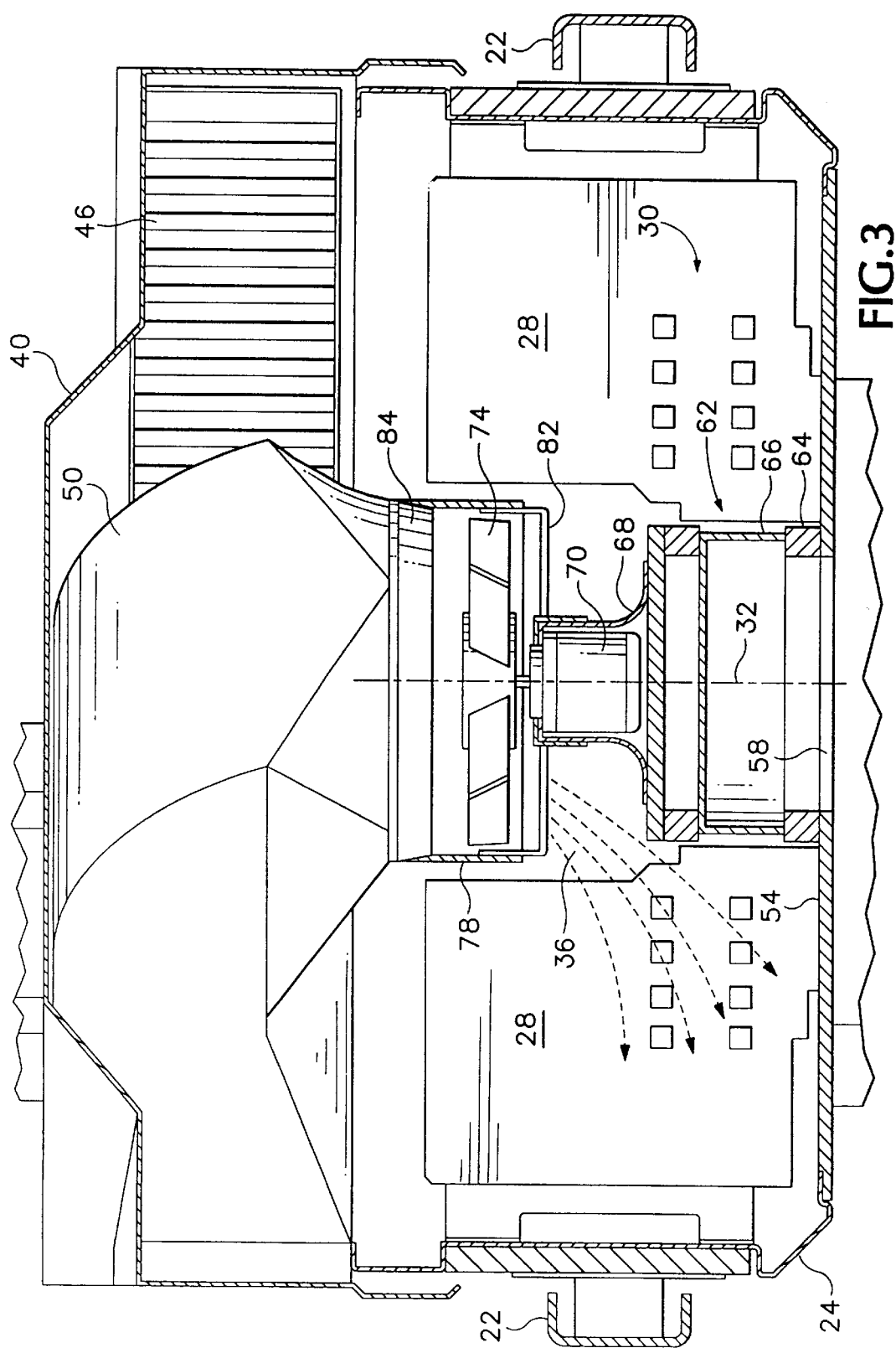

COOLING SYSTEM FOR TEST HEAD

BACKGROUND OF THE INVENTION

This invention relates to a cooling system for a test head for a semiconductor tester.

A known form of test head for a semiconductor integrated circuit tester is generally parallelepipedal in shape and has two opposite main faces which are nearly square and are spaced at a distance which is considerably less than the length of the shorter sides of the main faces. In the so-called DUT down orientation of the test head, the two major faces are horizontal. For the sake of convenience in the following description of the known test head, it will be assumed, except where the context indicates otherwise, that the test head is in the DUT down orientation.

The known form of test head comprises a housing and multiple pin cards which are located in the housing and are disposed vertically, extending radially from a vertical axis. The pin cards are equidistant from the vertical axis and are spaced therefrom, so that the inner vertical edges of the pin cards surround a vertical circular passage in the test head. Each card has a lower edge at which it is provided with contact pins for engaging a load board, which is attached to the housing and provides an electrical interface between the pin cards and a device under test (DUT). Each pin card carries numerous integrated circuits, including drivers and comparators which can be operated selectively for applying stimulus signals to, or measuring response signals from, the DUT. Operation of the drivers and comparators dissipates substantial heat. In order to prevent overheating of the test head, which can impair the accuracy of a test, exhaust fans are attached to vertical side walls of the housing for exhausting air from the housing through vent openings in the vertical side walls. When the fans are in operation, they create a negative pressure in the housing and draw air into the housing through an air inlet opening in a horizontal top wall of the housing. The air flows at high speed between the cards, where heat is transferred convectively from the electronic components to the air, and is exhausted from the housing through the vertical side walls. In a practical implementation of this form of test head, there are four vent openings, each with an exhaust fan, in each of the four vertical side walls of the housing.

It has been found that this type of cooling system is subject to disadvantage. In particular, it may be desired to use the test head in a laminar flow tent, in which the test head is positioned in a space bounded by curtains and a flow of clean air is induced downward past the test head. It is desirable that the downward flow of clean air should remain laminar, but the flow of air from the fans disrupts the laminar flow. It is further desirable that the clean air should remain at about ambient temperature in order to avoid overheating of the DUT, but the clean air is warmed by the exhaust air from the fans. For example, a test carried out at a room temperature of 23° C. showed temperatures in the range from about 63° C. to 93° C. in the vicinity of the drivers and comparators. In this test, the temperature of the DUT was measured at 51° C. and the temperature of air in the laminar flow tent was 35° C.

In another installation, the test head is used in conjunction with a wafer prober, in which the test head is positioned in a DUT up orientation beneath a device handler which is used for delivering devices to the test head for testing. In this installation, supply of cooling air to the test head is limited by the structure of the wafer prober and the test head cooling system might not be able to maintain the test head at the proper temperature.

In any orientation of the test head, there is a tendency for heated, exhaust air to recirculate back into the test head through the air inlet. This is especially true when the test head is used in the confined space of certain device handlers. This recirculation, or feeding on its own exhaust, results in operation specification drift and yield reduction for tested devices.

The tendency for exhaust air to be recirculated back into the test head is stronger when the test head is in the DUT down orientation than when it is in the DUT up orientation, because in the DUT down orientation the air inlet is above the vent openings. This difference in flow conditions, depending on test head orientation, results in the temperature in the test head being dependent on test head orientation.

Moreover, regardless of the difficulties with respect to use in a laminar flow tent or in conjunction with a wafer prober, or in connection with orientation of the test head, the air flow induced by the sixteen fans in the conventional test head is not optimum for removing heat from the pin cards. Thus, most of the heat dissipated in operation of the test head is dissipated by the drivers and comparators, which are near the bottom of the pin card, close to the contact pins of the pin card, but the major part of the air flow induced by the fans is over the upper regions of the pin cards; therefore, the most heat sensitive components are not impacted directly by the high speed stream of cooling air with consequent reduced reliability, performance and life expectancy.

Further, since there are four fans at each of the four vertical side walls of the test head, the level of noise is substantially the same in all directions and in some applications, the noise generated by the fans may be objectionable to workers in the vicinity of the test head.

SUMMARY OF THE INVENTION

According to a first aspect of the present invention there is provided a test head for a semiconductor integrated circuit tester, the test head comprising a housing which bounds a pin card space and an air chamber, there being a boundary surface between the pin card space and the air chamber, and the housing having first and second air flow openings, a plurality of pin cards mounted in the housing and radiating from an interior cavity, the pin cards being located in the pin card space and surrounding the interior cavity, and a baffle structure which divides the air chamber into an air duct which provides communication between the first air flow opening and the pin card space by way of the interior cavity and a plenum which provides communication between the second air flow opening and the pin card space by way of the boundary surface.

According to a second aspect of the present invention there is provided a test head for a semiconductor integrated circuit tester, the test head comprising a housing which bounds a pin card space and an air chamber, there being a boundary surface between the pin card space and the air chamber, and the housing having an air inlet opening and an air outlet opening, a plurality of pin cards located in the pin card space and radiating from an interior cavity which is within the pin card space, a baffle structure which divides the air chamber into an air supply duct which provides communication between the air inlet opening and the interior cavity and an outlet plenum which provides communication between the pin card space and the air outlet opening by way of the boundary surface, and a fan mounted in the interior cavity for inducing a flow of air from the interior cavity to the plenum by way of spaces between the pin cards.

BRIEF DESCRIPTION OF THE DRAWINGS

For a better understanding of the invention, and to show how the same may be carried into effect, reference will now be made, by way of example, to the accompanying drawings, in which FIG. 3 is a vertical sectional view of the test head.

DETAILED DESCRIPTION

Figure 1:
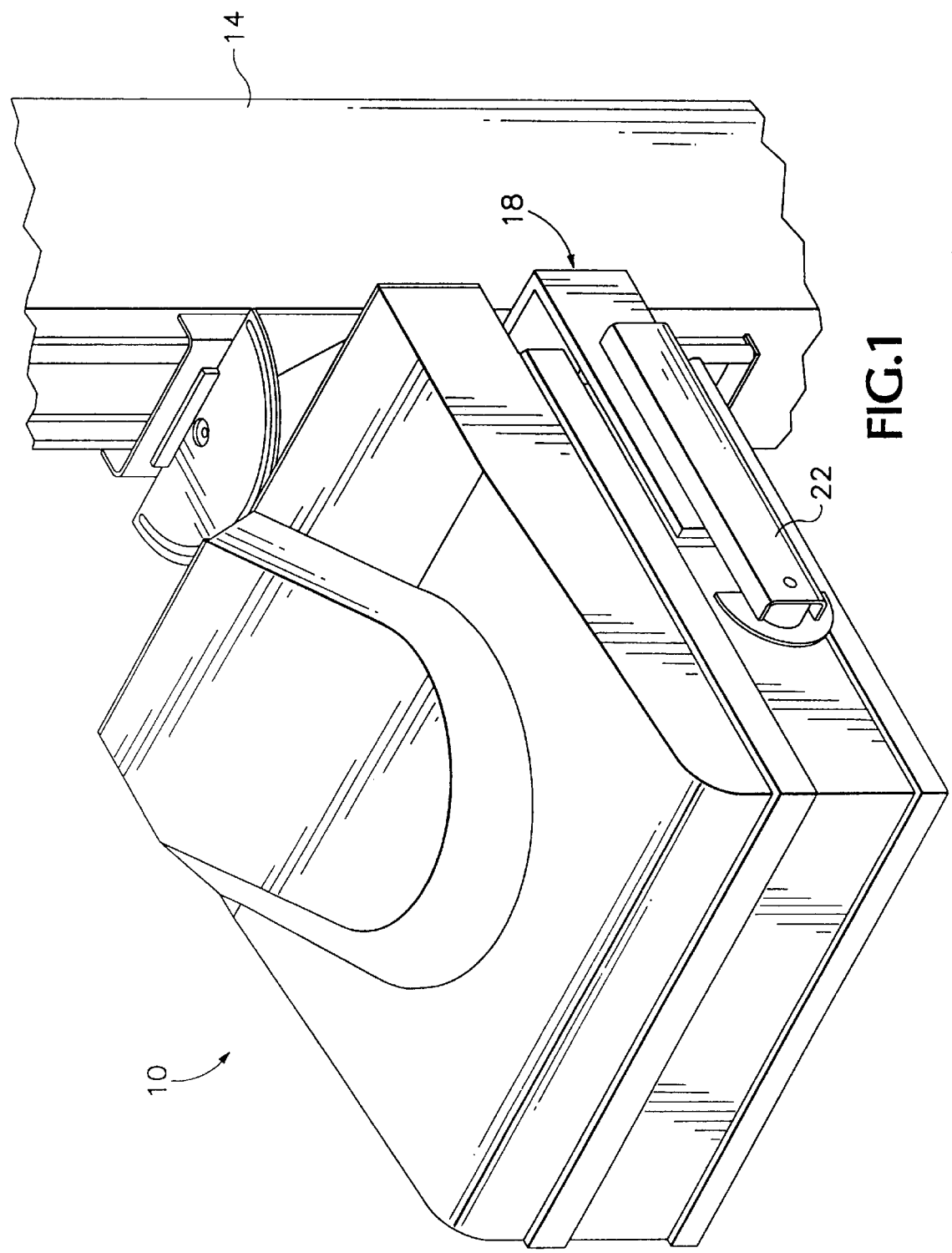
FIG. 1 is a front perspective view of a test head in accordance with the invention.
Figure 2:
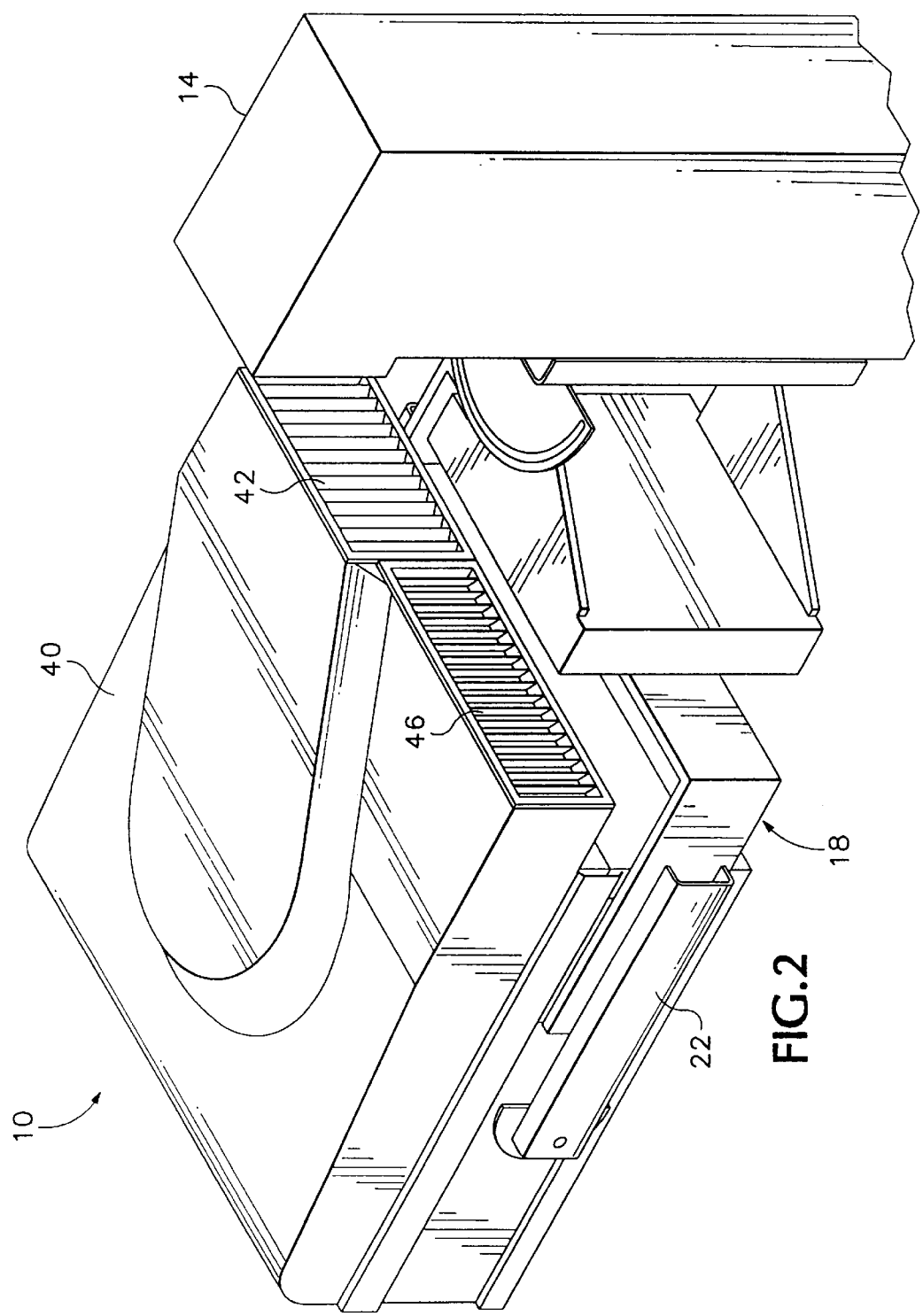
FIG. 2 is a rear perspective view of the test head.

FIG. 1 shows a test head 10 mounted on a manipulator column 14 by a U-shaped bracket 18 having two parallel arms 22. Referring to FIG. 3, the test head has a housing 24, and numerous pin cards 28 are mounted in the housing 24. For simplicity of illustration, only two pin cards are shown in FIG. 3, but in a practical implementation of the invention, there are 72 pin cards. Depending on requirements, the test head may contain more or less than 72 pin cards. The pin cards extend radially from a central axis 32 of the test head. The pin cards are equidistant from the axis 32 and are equiangularly distributed about the axis 32, so that the inner edges of the pin cards surround a generally cylindrical cavity 36. Integrated circuits, including drivers and comparators 30, are mounted on the pin cards.

The top wall of the housing 24 is implemented by a hood or cowl 40 having an air inlet opening 42 and an air outlet opening 46 at one edge of the housing and bounding an air chamber above the pin cards 28. The hood 40 is configured to accommodate a duct or baffle 50 which extends from the air inlet opening 42 and opens over the cylindrical cavity 36. The duct divides the air chamber into an inlet passage, inside the duct, and an outlet plenum, between the duct and the hood 40. The upper edges of the pin cards 28 are coplanar and define a boundary surface which separates the space containing the pin cards 28 from the outlet plenum.

The housing 24 includes a bottom plate 54, to which the load board (not shown) is attached. The bottom plate 54 has a circular central opening 58, and above the opening 58 is a motor mounting structure 62, which extends upward into the cylindrical cavity 36. The motor mounting structure includes an annular base 64 and a metal cap 66.

On top of the mounting structure 62 is a flow deflector 68 which is cylindrical at its upper end and flares downwardly. The flow deflector 68 accommodates an electric motor 70. An axial flow fan blade 74 is attached to the shaft of the motor 70. The blade 74 is located in a short cylindrical duct 78, which is attached to the flow deflector 68 by a spider 82. A cylindrical extension 84 of the duct 50 is fitted inside the upper end of the duct 78. The fan induces a flow of air through the air inlet opening 42, the duct 50 and the duct 78 and exhausts air downward towards the flow deflector 68. Operation of the fan creates a high positive pressure in the cylindrical cavity 36 below the fan blade. The flow deflector 68 directs the air flow outward between the pin cards. The annular base 64 and metal cap 66 prevent air from flowing out through the circular opening 58. The exhaust air flows upwardly between the pin cards into the outlet plenum and leaves the test head by way of the air outlet opening 46.

The side walls of the housing are substantially imperforate and consequently no air is exhausted from the housing through the side walls. However, the ability of the cooling system to remove heat from the pin cards would not be substantially impaired if exhaust air were permitted to flow through the side walls.

The test head shown in FIG. 3 can be used in a laminar flow tent with the air inlet and outlet openings 42 and 46 outside the tent. In this case, the warm air exhausted by way of the outlet opening 46 does not disrupt the laminar flow or heat the air flow. The test head can be used in conjunction with a wafer prober without danger of overheating because the flow of air to and from the test head is not impeded by the device handler. The inlet opening 42 and the outlet opening 46 are provided with suitable deflector vanes, so that the flow of warm air leaving the test head through the outlet opening is kept separate from the flow of cool air entering the test head through the inlet opening and warm exhaust air is not recirculated. Flow conditions are not influenced significantly by orientation of the test head, and therefore the temperature in the test head does not depend on the orientation of the test head. Although the air flow through the inlet and outlet openings may create noise, the noise is localized and it is generally possible to position the test head so that the noise will not be disturbing to workers in the vicinity of the test head.

Due to the selection of the location of the fan and the presence of the deflector 68, substantially all air exhausted by the fan passes as a high speed stream between the pin cards near the drivers and comparators 30, allowing efficient removal of heat from these components. Since air cannot flow out of the housing through the opening 58, contaminants that might be present in the cooling air are kept separate from the DUT.

Tests carried out with a practical implementation of the test head shown in the drawings show a substantial reduction in the temperature in the test head compared with the conventional test head. A test carried out at a room temperature of 26° C. showed temperatures in the vicinity of the drivers and comparators in the range from about 34° C. to about 57° C., or about 30° C. lower than was found with the conventional test head. The temperature of the DUT was 26° C. and the temperature in the laminar flow tent was also 26° C.

It will be appreciated that the invention is not restricted to the particular embodiment that has been described, and that variations may be made therein without departing from the scope of the invention as defined in the appended claims and equivalents thereof.

What is claimed is:

1. A test head for a semiconductor integrated circuit tester, the test head comprising:

a housing which bounds a pin card space and an air chamber, there being a boundary surface between the pin card space and the air chamber, and the housing having an air inlet opening and an air outlet opening, a plurality of pin cards mounted in the housing and radiating from an interior cavity, the pin cards being located in the pin card space and surrounding the interior cavity, a baffle structure which divides the air chamber into an air passage and an outlet plenum, the air passage providing communication between the air inlet opening and the pin card space by way of the interior cavity and the outlet plenum providing communication between the pin card space and the air outlet opening by way of the boundary surface, and an electrically driven fan mounted in the cylindrical interior cavity for inducing a flow of air into the housing through the air inlet opening and exhausting air from the housing through the air outlet opening, whereby positive pressure is created in the pin card space.

2. A test head according to claim 1, wherein the interior cavity is cylindrical and has a central axis and the pin cards extend radially of the central axis of the cylindrical interior cavity.

3. A test head according to claim 1, wherein the electrically driven fan includes a fan blade and an electric motor, the fan blade being mounted in the cylindrical interior cavity to rotate about the central axis thereof.

4. A test head according to claim 1, wherein the baffle structure comprises a duct member mounted in the air chamber and having one end registering with the air inlet opening and an opposite end registering with the interior cavity.

5. A test head according to claim 4, wherein the duct member has a cylindrical extension projecting into the interior cavity and the electrically driven fan includes a fan blade mounted coaxially with the cylindrical extension of the duct member.

6. A test head according to claim 1, wherein the housing is generally parallelepipedal in form and has four side walls, and the air outlet opening is restricted to one of said side walls.

7. A test head according to claim 6, wherein the air inlet opening is restricted to said one side wall.

8. A test head for a semiconductor integrated circuit tester, the test head comprising:

a housing which bounds a pin card space and an air chamber, there being a boundary surface between the pin card space and the air chamber, and the housing having an air inlet opening and an air outlet opening, a plurality of pin cards located in the pin card space and radiating from an interior cavity which is within the pin card space, a baffle structure which divides the air chamber into an air supply passage and an outlet plenum, the air supply passage providing communication between the air inlet opening and the interior cavity and the outlet plenum providing communication between the pin card space and the air outlet opening by way of the boundary surface, and a fan mounted in the interior cavity for inducing a flow of air from the interior cavity to the plenum by way of spaces between the pin cards.

9. A test head according to claim 8, wherein the interior cavity is cylindrical and has a central axis and the pin cards extend radially of the central axis of the cylindrical interior cavity.

10. A test head according to claim 9, wherein the fan is an electrically driven fan and includes a fan blade and an electric motor, the fan blade being mounted in the cylindrical interior cavity to rotate about the central axis thereof.

11. A test head according to claim 8, wherein the baffle structure comprises a duct member mounted in the air chamber and having one end registering with the air inlet opening and an opposite end registering with the interior cavity.

12. A test head according to claim 11, wherein the duct member has a cylindrical extension projecting into the interior cavity and the fan includes a fan blade mounted coaxially with the cylindrical extension of the duct member.

13. A test head according to claim 8, wherein the housing is generally parallelepipedal in form and has four side walls, and the air outlet opening is restricted to one of said side walls.

14. A test head according to claim 13, wherein the air inlet opening is restricted to said one side wall.

* * * * *